Nov. 5, 1968 E. K. DALTON 3,409,833

SYSTEM FOR DETECTION AND RECONSTRUCTION OF BINARY DATA TRANSMITTED AT RATES UP TO AND EXCEEDING TWICE THE NYQUIST RATE

Filed Nov. 22, 1965 2 Sheets-Sheet 1

INVENTOR.
EDWARD K. DALTON
By White & Haefliger
ATTORNEYS.

INVENTOR.
EDWARD K. DALTON
BY White & Haefliger
ATTORNEYS.

United States Patent Office 3,409,833
Patented Nov. 5, 1968

3,409,833

SYSTEM FOR DETECTION AND RECONSTRUCTION OF BINARY DATA TRANSMITTED AT RATES UP TO AND EXCEEDING TWICE THE NYQUIST RATE

Edward K. Dalton, Laguna Beach, Calif., assignor to Astrodata, Inc., Anaheim, Calif., a corporation of California Filed Nov. 22, 1965, Ser. No. 508,963
11 Claims. (Cl. 325—321)

This invention relates generally to binary data transmission equipment, and more specifically concerns the optimizing of such transmission where the bit rate may vary, as well as the reduction of error.

Transmission of binary data generally proceeds through the propagation of two distinguishable signals, which may be designated +1 and −1, +1 corresponding for instance to a MARK in the binary code sequence, and −1 to a SPACE. Distortions produced by the transmission media and the presence of noise contribute jointly to a degradation of the signal, so that some sort of decision procedure and signal reconstruction must be effected at the receiver. The conventional method is to employ a threshold set at the value 0, so that signal levels greater than 0 are interpreted as +1, and signal levels less than 0 are interpreted as −1.

While this procedure is often adequate, difficulties are encountered in some cases. Specifically, when the binary data rate is above the Nyquist rate (equal to twice the transmission bandwidth, and commonly regarded as the upper limit on the rate of binary data transmission), use of the method described above results in a disproportionate number of wrong decisions (errors). In recent years, attempts have been made to find a superior processing method for use in such cases of high speed data transmission. The most well known of these, commonly referred to as duo-binary, employs a modification of the transmitted signal, and a special three-level detection scheme at the receiver. The method is able to transmit data at twice the Nyquist rate, with a decrease in noise margin of about 6 db. However, if this method is used at lower rates, particularly at speeds less than the Nyquist rate, it is significantly inferior to the conventional method.

The method of the present invention is superior to duo-binary in that at high data rates (equal to twice the Nyquist rate or more) it produces results better than are characteristic of duo-binary, whereas at low speeds (equal to the Nyquist rate or less) the performance is as good as that of the conventional method. At intermediate rates the method outperforms both the conventional and duo-binary methods.

Basically, the invention has as its major object the provision of first means to establish upper and lower signal amplitude thresholds, and second means to maintain a MARK (as for example +1) output when the signal amplitude is above an upper threshold, to maintain a SPACE (as for example −1) output when the signal amplitude is below a lower threshold, to provide a MARK output when the signal amplitude traverses a lower threshold toward an upper threshold, and to provide a SPACE output when the signal amplitude traverses an upper threshold toward a lower threshold. Typically, the second means includes apparatus to provide a sequence of alternate MARK and SPACE outputs when the signal amplitude continues between the upper and lower thresholds, the sequence being initiated by the MARK or SPACE output provided in response to the traversal of the upper or lower thresholds, the latter being controllable. Thus in one embodiment, signal levels greater than $+\beta$ (the upper zone) are interpreted as MARK outputs, signal levels less than $-\beta$ (the lower zone) are interpreted as SPACE outputs, and signal levels between $+\beta$ and $-\beta$ (the middle zone) are taken to represent a sequence of alternate MARK and SPACE outputs, the sequence initiated by the MARK or SPACE output provided in response to signal traversal of the $+\beta$ or $-\beta$ thresholds.

An important result of this novel and unusal system resides in the fact that at bit rates below twice the Nyquist rate advantage may be taken of all available bandwidths, and transitions are possible between any two of the three zones. In other systems this is not possible, since required filters preclude the transition from the upper to the lower zone without deriving an output as a result of transition through the middle zone. Also, error is reduced, as will be described.

Another object of the invention is the provision of means to control the levels of one or both of the upper and lower thresholds, to accommdoate transmission of binary data at speeds between the Nyquist rate and twice that rate, all without impairment of results.

Further objects of the invention include the provision of multiple upper thresholds and multiple lower thresholds, providing greater flexibility as regards bit rate speed changes, and characterized in the maintenance of a MARK output when the signal amplitude is above an upper upper threshold, the maintenance of a SPACE output when the signal amplitude is below a lower lower threshold, the provision of a MARK output when the signal amplitude upwardly traverses the upper lower threshold and the provision of a SPACE output when the signal amplitude downwardly traverses the lower upper threshold; and the provision of spiker, gate, flip-flop and clock elements connected in modes to produce the aforesaid results.

These and other objects and advantages of the invention, as well as the details of an illustrative embodiment, will be more fully understood from the following detailed description of the drawings, in which.

FIGS. *5a* and *5b* illustrate the reduction of error due to noise.

Figure 1:
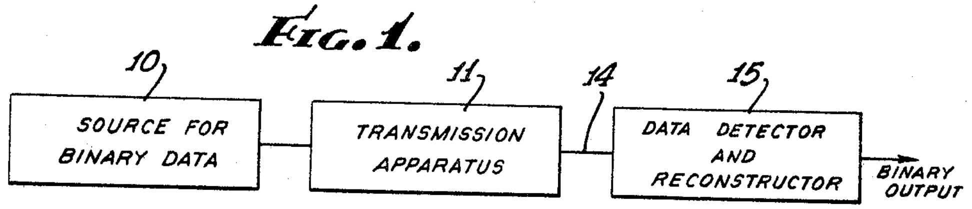
FIG. 1 is an overall block diagram of a system in which the invention may be incorporated.

Referring first to FIG. 1, a conventional source for binary data is indicated at 10, and conventional transmission equipment and media appears at 11. The latter may for example include baseband, carrier or other type transmission equipment. One example of baseband transmission would be a cable. If carrier transmission is utilized, block 11 may include amplitude modulation, frequency modulation or phase modulation equipment. A representation of the binary data waveform output from source is seen at 12 in FIG. 4, with MARK and SPACE levels 16 and 17, whereas numeral 13 in FIG. 4 indicates a corresponding signal or waveform received from the transmission equipment and passed at 14 in FIG. 1 to the data detector and reconstructor 15.

Figure 4:
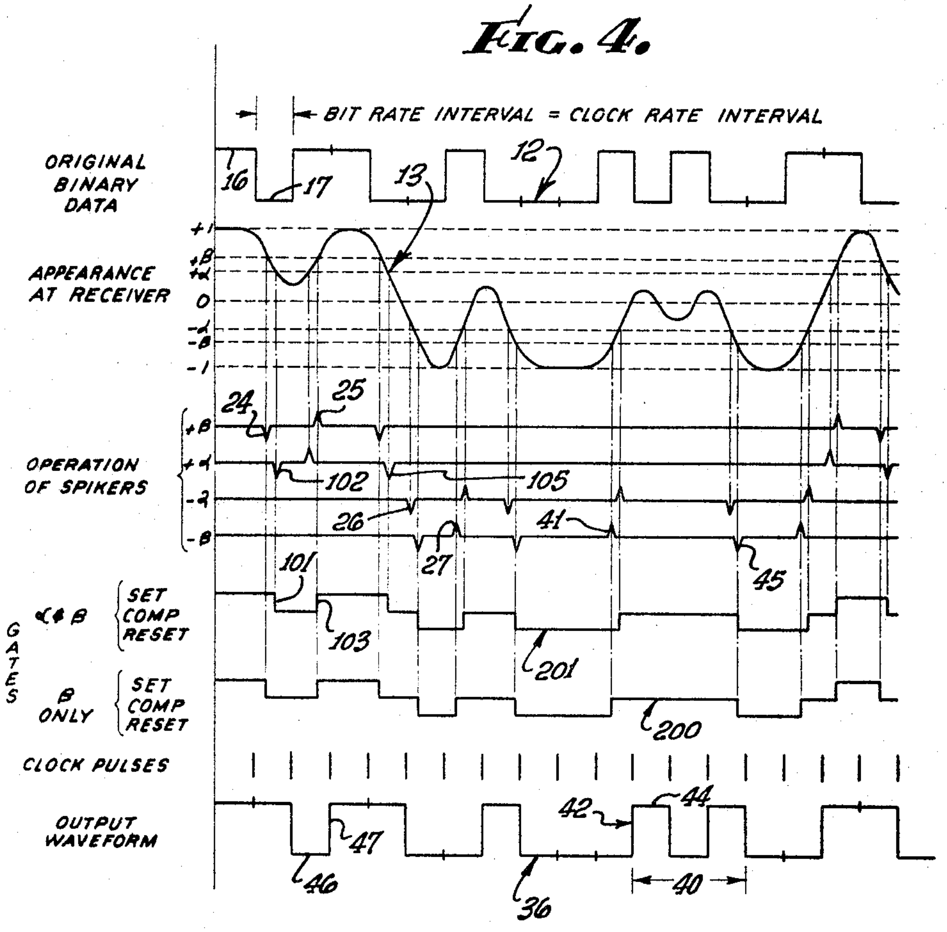
FIG. 4 illustrates pertinent wave forms.

Block 15 may be considered to include first means to establish upper and lower signal amplitude thresholds, and second means to maintain a MARK output when the signal amplitude is above an upper threshold, to maintain a SPACE output when the signal amplitude is below a lower threshold, to provide a MARK output when the signal amplitude traverses a lower threshold toward an upper threshold, and to provide a SPACE output when the signal amplitude traverses an upper threshold toward a lower threshold. Reference to FIG. 4 will show typical upper and lower thresholds $+\beta$ and $-\beta$, as well as auxiliary upper and lower thresholds $+\alpha$ and $-\alpha$, these being traversed by the signal 13.

Figure 2:
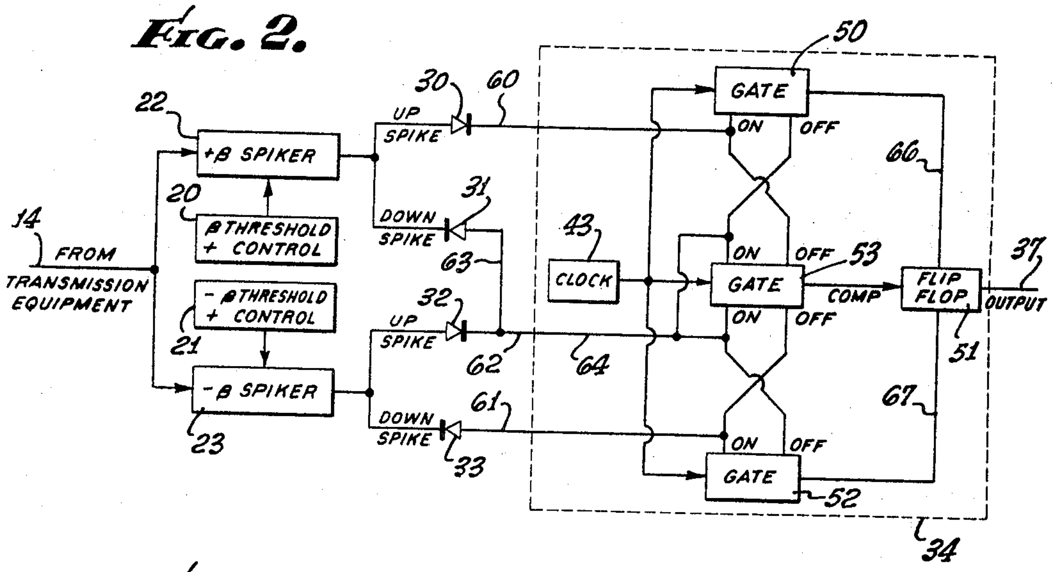
FIG. 2 is a detailed showing of one form of data detector and reconstructor means.

The $+\beta$ and $-\beta$ thresholds may typically be established at 20 and 21 as seen in FIG. 2, and controlling the $+\beta$ and $-\beta$ spikers or comparators 22 and 23. The $+\beta$ spiker 22 produces down and up spikes or pulses, such as are see at 24 and 25 in FIG. 4, when the signal 13 traverses the $+\beta$ threshold downwardly and upwardly respectively. Similarly, the $-\beta$ spiker 23 produces down and up spikes 26 and 27 when the signal 13 traverses the $-\beta$ threshold in downward and upward directions respectively. Accordingly, the waveform 13 is subjected to detection by the equipment 20–23, to produce up and down spikes transmitted via the diodes 30, 31, 32 and 33 to the binary waveform reconstructor 34.

It is the function of the reconstructor 34 to closely reproduce the original binary waveform from the input spikes, as for example are transmitted by the diodes 30–33. The reproduced waveform, using only the $+\beta$ and $-\beta$ thresholds, is seen at 36 in FIG. 4, that waveform appearing at the reconstructor output 37. The corresponding condition of the gates is seen at waveform 200 in FIG. 4. In this regard, the reconstructor includes apparatus such as may include a clock 43 to provide a sequence of alternate MARK and SPACE outputs when the signal in effect continues between the upper and lower thresholds $+\beta$ and $-\beta$ for a time interval longer than one bit interval. Thus, in the time interval 40 of FIG. 4, signal 13 continues between the thresholds $-\beta$ and $+\beta$, the up spike 41 crossing threshold $-\beta$ initiating the sequence 42 of MARK and SPACE outputs during that interval. Note that the sequence 42 is initiated by a MARK output 44 in response to the up direction crossing of the lower threshold $-\beta$ by the signal 13 producing up spike 41. Sequence 42 is terminated when the signal 13 crosses the lower threshold $-\beta$ in a downward direction, to produce the down spike 45.

Similarly, a sequence of SPACE and MARK outputs is initiated by the spike 24, the first being the SPACE output 46; however, this sequence is terminated by the up spike 25, which results in a MARK output at the time 47 of the next clock pulse. In these regards, the clock period is typically set to equal the data bit period, and the clock is synchronized with the output binary waveform.

The specific reconstructor 34 of FIG. 2 includes a flip-flop, and gates responsive to the up and down spike inputs to control the state of the flip-flop as by control of clock pulse input to the flip-flop. For example, a first gate 50 is connected to pass a pulse from clock 43 to set the flip-flop 51 in response to input of an up spike produced when signal 13 crosses the upper threshold $+\beta$, a second gate 52 connected to pass a clock pulse to reset the flip-flop in response to input of a down spike produced when the signal crosses the lower threshold, and a third gate 53 connected to pass a clock pulse to complement the flip-flop in response to input of a down spike produced when signal crosses the upper threshold and also in response to input of an up spike produced when the signal crosses the lower threshold.

Typically, up spike transmitting branch 60 containing diode 30 is connected to the ON terminal of gate 50 and to the OFF terminal of gate 53; down spike transmitting branch 61 containing diode 33 is connected to the ON terminal of gate 52 and to the OFF terminal of gate 53; up spike branch 62 containing diode 32 and down spike branch 63 containing diode 31 are both connected via leg 64 with the ON terminal of gate 53 and with the OFF terminals of gates 50 and 52; and the clock 43 is connected with the gate inputs as shown so that a clock pulse is passed by any gate in ON state, but not in OFF state. The connections from the gates to the set, reset and complement inputs of the flip-flop are seen at 66, 67 and 68.

At lower data rates a transition from the upper zone (i.e. above $+\beta$ threshold) to the lower zone (i.e. below $-\beta$ threshold) is possible without deriving an output through gate 53 as a result of transition through the middle zone (between $+\beta$ and $-\beta$ thresholds). This is of importance at bit rates below twice the Nyquist rate, as pointed out in the introduction.

Figure 5A:
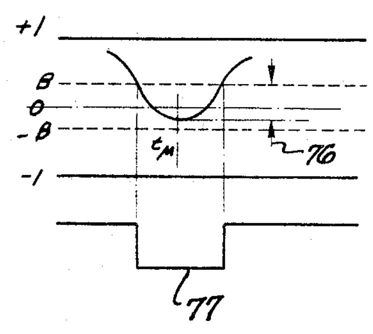
Figure 5B:
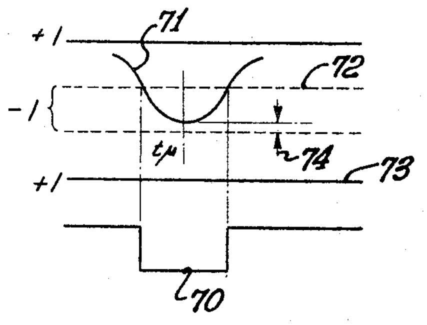

A further advantage of error reduction is seen by comparison of FIGS. 5*a* and 5*b*. In prior device of FIG. 5*b*, a SPACE output 70 results when the signal 71 penetrates below the upper threshold 72, and a MARK output would result were the signal to penetrate below the lower threshold 73. Thus, at time $t_n$, an amount 74 of noise associated with the signal would be sufficient to cause an erroneous MARK output. In the present device of FIG. 5*a*, the signal waveform 75 is the same as waveform 71 of FIG. 5*b*; however, at time $t_n$ a larger amount of noise 76 would be required to cause an erroneous MARK output, rather than allowing the SPACE output 77 to continue.

A still further advantage is afforded by the $+\beta$ and $-\beta$ threshold controls 20 and 21. These allow shifting of $+\beta$ and $-\beta$ from about .5 and $-.5$ respectively, for data rates equal to twice the Nyquist rate, to 0 for data rates below the Nyquist rate. The controls may have feedback connections at 80 and 81 to be responsive to the output at 37 for adjusting the threshold as the data rate changes between the Nyquist rate and twice the latter.

Figure 3:
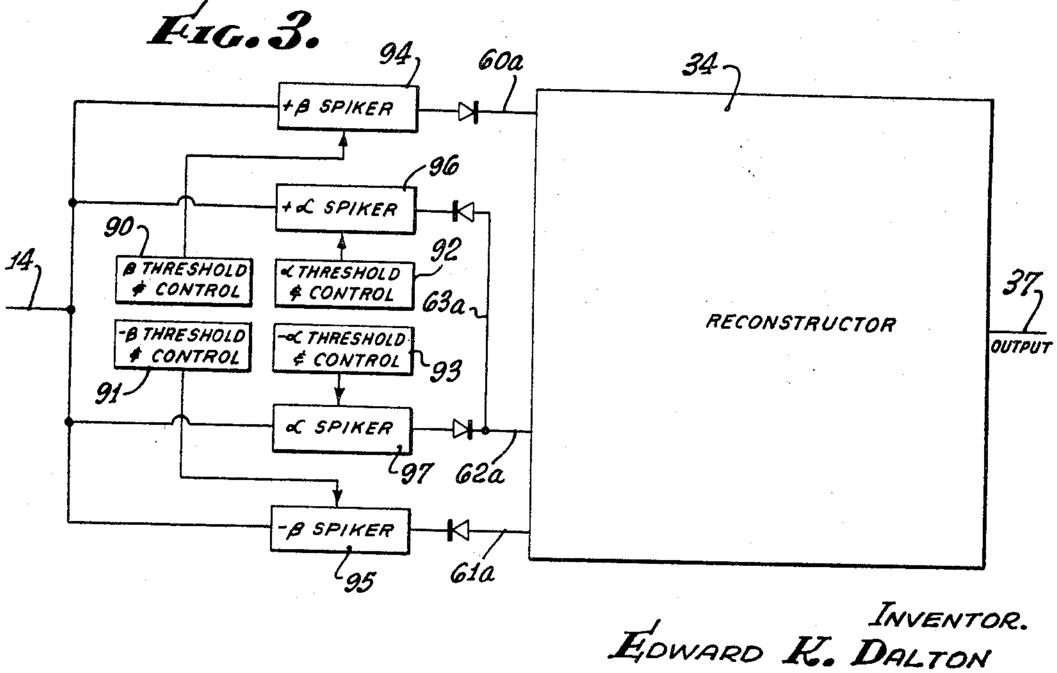
FIG. 3 is a detailed showing of another form of data detector and reconstructor means.

In the embodiment of FIG. 3, the devices 90, 91, 92 and 93 respectively establish upper upper threshold $+\beta$, lower lower threshold $-\beta$, lower upper threshold $+\alpha$ and upper lower threshold $-\alpha$, all of which are seen in FIG. 4. Devices 90–93 respectively control the spikers or comparators 94–97 to which is fed the signal 13 from the transmission apparatus. The spikers have connection via branches 60*a*, 61*a*, 62*a* and 63*a* (corresponds to branches 60–63 of FIG. 2) with the gates of a reconstructor 34 the same as that described in FIG. 2.

The operation is generally the same, excepting that the apparatus maintains a MARK output when the signal amplitude is above the $+\beta$ threshold, it maintains a SPACE output when the signal is below the $-\beta$ threshold, it provides a MARK output when the signal amplitude traverses the $-\alpha$ threshold toward the $+\beta$ and $+\alpha$ thresholds, and it provides a SPACE output when the signal traverses the $\alpha$ threshold toward the $-\alpha$ and $-\beta$ thresholds. See for example the condition of the gates as seen at waveform 201 in FIG. 4. State change 101 of the gating is effected by down spike 102 which occurs when signal 13 crosses threshold $+\alpha$ in a down direction; state change 103 is effected by up spike 25 serving to maintain that gate state until the occurrence of down spike 105, etc. Waveform 36 as shown duplicates the original binary data waveform 12 for both threshold configurations ($\beta$ alone, and $\alpha$ and $\beta$ together), since there is no noise shown on input waveform 13; however, in the presence of noise the output waveform 36, for the $\alpha$ and $\beta$ threshold utilization case, may differ from the waveform in the case where $\beta$ threshold alone is used. In such event, the thresholds $\alpha$ and $\beta$ can be set to result in less output waveform error than is possible using $\beta$ threshold alone.

Individual controls at 90–93 facilitate adjustment of the thresholds $+\beta$, $-\beta$, $+\alpha$ and $-\alpha$ for optimum flexibility as regards changes in the data bit rate.

I claim:

1. In binary data transmission equipment, first means to establish upper and lower signal amplitude thresholds, and second means to maintain a MARK output when the signal amplitude is above an upper threshold, to maintain a SPACE output when the signal amplitude is below a lower threshold, to provide a MARK output when the signal amplitude traverses a lower threshold toward an upper threshold, and to provide a SPACE output when the signal amplitude traverses an upper threshold toward a lower threshold.

2. The combination of claim 1 in which said second means includes apparatus to provide a sequence of alternate MARK and SPACE outputs when the signal amplitude continues between the upper and lower thresholds, the sequence being initiated by the MARK or SPACE output provided in response to said traversal of the upper or lower threshold.

3. The combination of claim 1 including means to control at least one of said thresholds to change its separation from another of said thresholds.

4. The combination of claim 1 in which said upper thresholds include upper upper and lower upper thresholds, and said lower thresholds include lower lower and upper lower thresholds.

5. The combination of claim 4 in which said second means includes apparatus to maintain a MARK output when the signal amplitude is above the upper upper threshold, to maintain a SPACE output when the signal amplitude is below the lower lower threshold, to provide a MARK output when the signal amplitude traverses the upper lower threshold toward the lower upper thresholds, and to provide a SPACE output when the signal amplitude traverses the lower upper threshold toward the upper lower threshold.

6. The combination of claim 1 in which said second means includes a pair of spikers to produce up spikes when the signal crosses the upper and lower thresholds in up directions and to produce down spikes when the signal crosses the lower and upper thresholds in down directions.

7. The combination of claim 6 in which said second means includes a flip-flop, a source of clock pulses, and gates responsive to said up and down spikes to control the state of the flip-flop by control of clock pulse input to the flip-flop.

8. The combination of claim 7 in which said gates include a first gate connected to pass a clock pulse to set the flip-flop in response to input of an up spike produced when the signal crosses the upper threshold, a second gate connected to pass a clock pulse to re-set the flip-flop in response to input of a down spike produced when the signal crosses the lower threshold, and a third gate connected to pass a clock pulse to complement the flip-flop in response to input of a down spike produced when the signal crosses the upper threshold and also in response to input of an up spike produced when the signal crosses the lower threshold.

9. The combination of claim 8 including means to control the levels of said thresholds.

10. The combination of claim 1 including a source of said binary data having a bit rate of up to four times the frequency bandwidth limit of a channel of said equipment that transmits the data.

11. The combination of claim 10 including said transmission equipment.

References Cited

UNITED STATES PATENTS

| | | | |
|---|---|---|---|
| 3,238,299 | 3/1966 | Lender | 325—38 X |
| 3,267,459 | 8/1966 | Chomicki et al. | |

ROBERT L. GRIFFIN, *Primary Examiner.*

J. T. STRATMAN, *Assistant Examiner.*